(12) United States Patent
Moussakov et al.

(10) Patent No.: US 8,987,995 B2
(45) Date of Patent: Mar. 24, 2015

(54) POWER SUPPLIES FOR LED LIGHT FIXTURES

(75) Inventors: Milen Moussakov, New Westminster (CA); Thomas George Foxall, Surrey (CA)

(73) Assignee: Koninklijke Philips N.V., Eindhoven (NL)

( * ) Notice: Subject to any disclaimer, the term of this patent is extended or adjusted under 35 U.S.C. 154(b) by 913 days.

(21) Appl. No.: 12/912,633

(22) Filed: Oct. 26, 2010

(65) Prior Publication Data
US 2011/0095704 A1    Apr. 28, 2011

Related U.S. Application Data

(60) Provisional application No. 61/279,753, filed on Oct. 26, 2009.

(51) Int. Cl.
*H05B 39/02* (2006.01)
*H05B 33/08* (2006.01)

(52) U.S. Cl.
CPC ........... *H05B 33/0815* (2013.01); *Y02B 20/346* (2013.01)
USPC ........... 315/209 R; 315/226; 315/47; 315/193

(58) Field of Classification Search
CPC .......................... H05B 33/0815; Y02B 20/346
USPC ............. 315/291, 294, 295, 307, 185 R, 192, 315/193, 169.3, 186, 312, 121–123, 209 R, 315/226, 293, 292, 47, 174; 345/76–78, 82, 345/83, 102
See application file for complete search history.

(56) References Cited

U.S. PATENT DOCUMENTS

| 4,586,118 A | 4/1986 | Mihalka |
| 4,591,728 A | 5/1986 | Kruger et al. |

(Continued)

FOREIGN PATENT DOCUMENTS

| JP | 2002008409 A | 1/2002 |
| WO | 2010027254 A1 | 3/2010 |

OTHER PUBLICATIONS http://www.acriche.com/en/, Oct. 25, 2010.
(Continued)

*Primary Examiner* — Douglas W Owens
*Assistant Examiner* — Borna Alaeddini
(74) *Attorney, Agent, or Firm* — Yuliya Mathis

(57) ABSTRACT

The lighting circuit comprises an AC input connectable to receive an AC input voltage, a switched LED array comprising a plurality of LEDs reconfigurable into a plurality of configurations and having an input for receiving a LED driving voltage, a switched capacitor array having an input for receiving a charging voltage and an output selectively connectable to the input of the switched LED array and comprising a plurality of capacitors and switches connected to selectively couple the capacitors across the input or output, a first switched rectifier connected between the AC input and the switched LED array, a second switched rectifier connected between the AC input and the switched capacitor array, and, a control system configured to monitor the AC input voltage and control the switched LED array, the switched capacitor array and the first and second switched rectifiers based on the AC input voltage and a desired light output.

24 Claims, 12 Drawing Sheets

(56) References Cited

U.S. PATENT DOCUMENTS

| | | | |
|---|---|---|---|
| 4,967,336 A | 10/1990 | Davies et al. | |
| 5,303,139 A | 4/1994 | Mark | |
| 5,457,450 A * | 10/1995 | Deese et al. | 340/912 |
| 5,532,528 A | 7/1996 | Lammers | |
| 5,568,035 A | 10/1996 | Kato et al. | |
| 5,600,550 A | 2/1997 | Cook, II | |
| 5,608,614 A * | 3/1997 | Ohnishi et al. | 363/60 |
| 5,668,711 A | 9/1997 | Lavieville et al. | |
| 5,734,205 A * | 3/1998 | Okamura et al. | 307/110 |
| 5,905,371 A * | 5/1999 | Limpaecher | 323/288 |
| 6,005,788 A * | 12/1999 | Lipo et al. | 363/71 |
| 6,313,513 B1 | 11/2001 | Imanishi et al. | |
| 6,317,343 B1 * | 11/2001 | Okamura et al. | 363/59 |
| 6,323,623 B1 * | 11/2001 | Someya et al. | 320/166 |
| 6,351,079 B1 | 2/2002 | Willis | |
| 6,465,995 B2 | 10/2002 | Barber et al. | |
| 6,528,954 B1 | 3/2003 | Lys et al. | |
| 6,577,072 B2 * | 6/2003 | Saito et al. | 315/185 R |
| 6,577,082 B2 * | 6/2003 | Yang et al. | 315/368.25 |
| 6,864,641 B2 | 3/2005 | Dygert | |
| 6,989,658 B2 | 1/2006 | Allwang | |
| 6,989,807 B2 | 1/2006 | Chiang | |
| 7,009,580 B2 | 3/2006 | Leung | |
| 7,012,463 B2 | 3/2006 | Nairn | |
| 7,190,210 B2 | 3/2007 | Azrai et al. | |
| 7,239,194 B2 | 7/2007 | Azrai et al. | |
| 7,259,525 B2 | 8/2007 | Yang | |
| 7,474,681 B2 | 1/2009 | Lin et al. | |
| 7,495,418 B2 | 2/2009 | Yano et al. | |
| 7,518,319 B2 | 4/2009 | Konno et al. | |
| 7,531,843 B2 | 5/2009 | Lin et al. | |
| 7,544,524 B2 | 6/2009 | Lin et al. | |
| 7,554,221 B2 | 6/2009 | Cassel | |
| 7,633,463 B2 | 12/2009 | Negru | |
| 7,688,002 B2 | 3/2010 | Ashdown et al. | |
| 7,701,149 B2 | 4/2010 | Lin | |
| 7,781,979 B2 | 8/2010 | Lys | |
| 7,936,135 B2 | 5/2011 | Hum et al. | |
| 7,986,107 B2 * | 7/2011 | Weaver et al. | 315/291 |
| 2004/0061451 A1 | 4/2004 | Tung | |
| 2005/0068706 A1 | 3/2005 | Lewis | |
| 2005/0088209 A1 | 4/2005 | Wessels | |
| 2005/0151717 A1 | 7/2005 | Seo | |
| 2006/0109219 A1 | 5/2006 | Robinson et al. | |
| 2007/0133230 A1 | 6/2007 | Lin | |
| 2007/0279821 A1 | 12/2007 | Sells | |
| 2009/0051296 A1 | 2/2009 | Ball | |
| 2009/0160365 A1 | 6/2009 | Niemitalo | |
| 2009/0160370 A1 | 6/2009 | Tai et al. | |
| 2009/0295292 A1 | 12/2009 | Harmgardt et al. | |
| 2009/0309417 A1 | 12/2009 | Walley | |
| 2009/0309645 A1 | 12/2009 | Isaacson et al. | |
| 2009/0309855 A1 | 12/2009 | Wang et al. | |
| 2009/0315477 A1 | 12/2009 | Kinsella | |
| 2010/0007600 A1 | 1/2010 | Deurenberg et al. | |
| 2010/0109557 A1 | 5/2010 | Bouchard | |
| 2010/0123403 A1 | 5/2010 | Reed | |
| 2010/0134018 A1 | 6/2010 | Tziony et al. | |
| 2010/0141169 A1 | 6/2010 | Summerland et al. | |
| 2010/0171145 A1 | 7/2010 | Morgan et al. | |
| 2010/0181923 A1 | 7/2010 | Hoogzaad | |
| 2012/0081022 A1 * | 4/2012 | Moussakov et al. | 315/240 |

OTHER PUBLICATIONS

Ishimatsu, K. et al., "A DC-AC Converter Using a Voltage Equational Type Switched-Capacitor Transformer", 1998 IEEE, pp. 603-306.

Ueno et al., "Realization of a Switched-Capacitor AC-DC Converter Using a New Phase Controller", 1991 IEEE Int. Sympo. on Circuit and Syst. (ISCAS'91), pp. 1057-1060, Jun. 1991.

Tse, C.K. et al., "On Lossless Switched-Capacitor Power Converters", IEEE Transactions on Power Electronics, vol. 10, No. 3, May 1995.

Ueno, F. et al., "Design and Realization of a Switched-Capacitor AC-DC Converter with a Low Output-Voltage Ripple", 1991 IEEE, pp. 1087-1090.

Eguchi, K. et al., "Design of a Step-Down AC-DC Converter for Energy Harvesting System Using Vibration-Based Energy", 2009 Fourth International Conference on Innovative Computing, Information and Control, Dec. 7, 2009, Abstract.

NCP 5304 High Voltage High and Low Side Driver, Product Specification, on Semiconductor, Jul. 2007.

* cited by examiner

POWER SUPPLIES FOR LED LIGHT FIXTURES

REFERENCE TO RELATED APPLICATION

This application claims the benefit under 35 U.S.C. §119 of U.S. Patent Application No. 61/279,753 filed 26 Oct. 2009 and entitled "SERIES PARALLEL LED SWITCHING", and a Canadian Patent Application filed 30 Sep. 2010 and entitled "APPARATUS AND METHODS FOR SUPPLYING POWER" (serial number unassigned, corresponding to U.S. patent application Ser. No. 12/896,619 filed 1 Oct. 2010 and entitled "APPARATUS AND METHODS FOR SUPPLYING POWER"), both of which are hereby incorporated herein by reference.

TECHNICAL FIELD

The invention relates to supplying electrical power to LED light fixtures, and configurations of LED light fixtures. Certain aspects relate to LED light fixtures which connect directly to AC power lines.

BACKGROUND

Prior art systems for supplying power from AC power lines to LED light fixtures typically involve the use of components such as filters, bridges and/or switched-mode power supplies (SMPS) comprising inductive transformers or inductors. Such components may adversely affect efficiency and power factor.

The inventors have determined a need for improved power supply systems which may be used to connect dimmable LED lighting fixtures directly to AC Mains. The inventor has also determined a need for LED lighting fixtures which can mimic the characteristics of incandescent light fixtures. The inventor has also determined a need for power supply systems which include power factor correction when a TRIAC dimmer is being used.

SUMMARY

The following embodiments and aspects thereof are described and illustrated in conjunction with systems, tools and methods which are meant to be exemplary and illustrative, not limiting in scope.

One aspect provides a lighting circuit comprising an AC input connectable to receive an AC input voltage, a switched LED array comprising a plurality of LEDs reconfigurable into a plurality of configurations, the switched LED array having an input for receiving a LED driving voltage, a switched capacitor array having an input for receiving a charging voltage and an output selectively connectable to the input of the switched LED array, the switched capacitor array comprising a plurality of capacitors and a plurality of switches connected to selectively couple the capacitors across the input of the switched capacitor array or the output of the switched capacitor array, a first switched rectifier connected between the AC input and the input of the switched LED array, a second switched rectifier connected between the AC input and the input of the switched capacitor array, and, a control system configured to monitor the AC input voltage and control the switched LED array, the switched capacitor array, the first switched rectifier and the second switched rectifier based on the AC input voltage and a desired light output.

One aspect provides a method comprising providing a switched LED array comprising a plurality of LEDs reconfigurable into a plurality of configurations, the switched LED array having an input for receiving a LED driving voltage, providing a switched capacitor array having an input for receiving a charging voltage and an output selectively connectable to the input of the switched LED array, the switched capacitor array comprising a plurality of capacitors and a plurality of switches connected to selectively couple the capacitors across the input of the switched capacitor array or the output of the switched capacitor array, providing a first switched rectifier connected between an AC input and the input of the switched LED array, providing a second switched rectifier connected between the AC input and the input of the switched capacitor array, monitoring an AC input voltage at the AC input, and, controlling the switched LED array, the switched capacitor array, the first switched rectifier and the second switched rectifier based on the AC input voltage and a desired light output.

One aspect provides a lighting circuit comprising a switched rectifier having an input connectable to receive an AC input voltage, a switched LED array comprising a plurality of LEDs reconfigurable into a plurality of configurations, the switched LED array having an input connected to an output of the switched rectifier, and, a control system configured to monitor the AC input voltage and control the switched LED array and the switched rectifier based on the AC input voltage and a desired light output.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
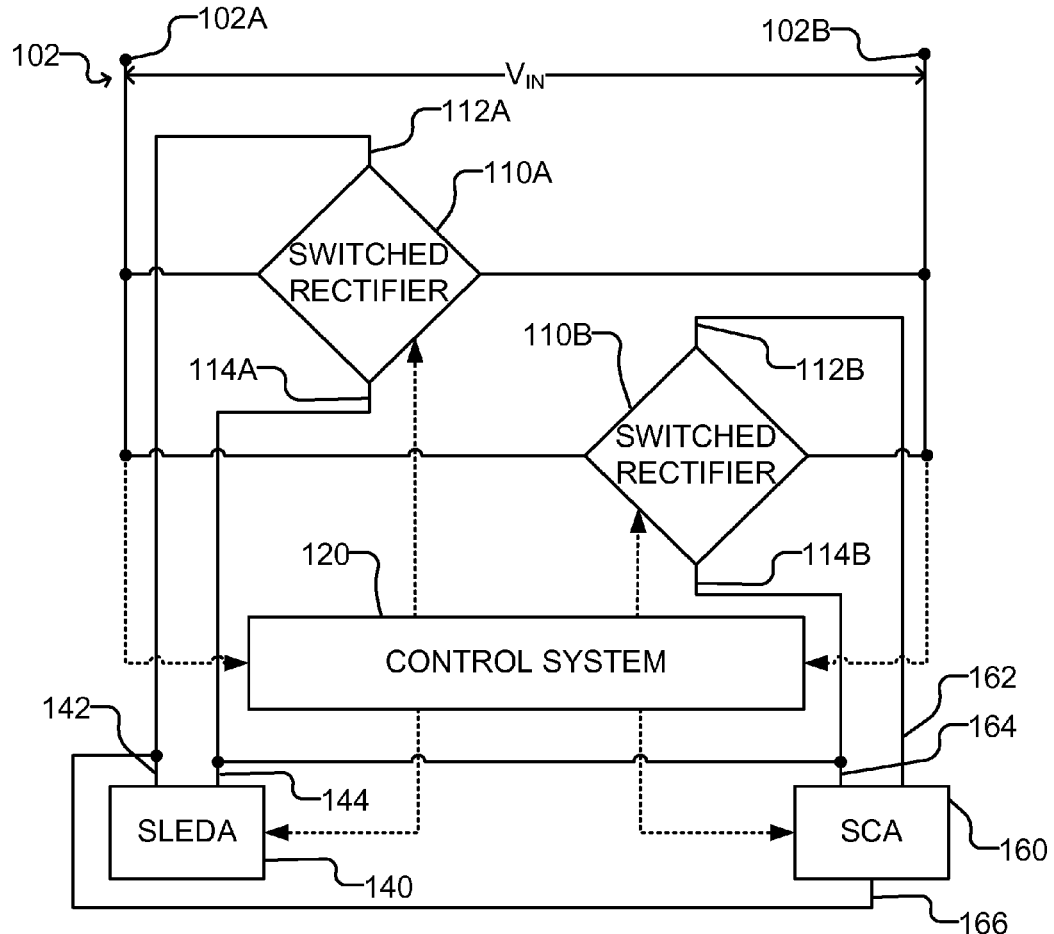
FIG. 1 shows an example lighting circuit according to one embodiment.

FIG. 1 shows an example lighting circuit 100 according to one embodiment. Circuit 100 comprises an input 102 connectable to receive an input voltage $V_{IN}$ across input lines 102A and 102B. Input voltage $V_{IN}$ may comprise, for example, a standard AC input voltage, which may or may not be dimmer-modulated, although as described below, circuit 100 is operable to accommodate a wide range of input voltage conditions.

First and second switched rectifiers 110A and 110B are connected across input lines 102A and 102B. First switched rectifier 110A has a positive output 112A and a negative output 114A respectively connected to positive and negative inputs 142 and 144 of a switched LED array (SLEDA) 140. Second switched rectifier 110B has a positive output 112B and a negative output 114B respectively connected to positive and negative inputs 162 and 164 of a switched capacitor array (SCA) 160. Negative input 164 of switched capacitor array 160 is connected to negative input 144 of switched LED array 140. A discharge output 166 of switched capacitor array 160 is connected to positive input 142 of switched LED array 140.

A control system 120 is connected to receive information about input voltage $V_{IN}$ from lines 102A and 102B, and control the operation of switched rectifiers 110A and 110B, switched LED array 140 and switched capacitor array 160. As described further below, control system 120 monitors input voltage $V_{IN}$ and, when the voltage level is at least a threshold level, operates switched rectifier 110A to supply AC voltage to directly drive switched LED array 140. Control system 120 also operates switched rectifier 110B to periodically provide charging voltages to switched capacitor array 160. As the voltage level changes, control system 120 also operates switched rectifier 110A to momentarily disconnect switched LED array 140 from receiving the AC voltage, reconfigures switched LED array 140, and then operates switched rectifier 110A to reconnect switched LED array 140 directly to the input AC voltage, in order to maintain the current through the LEDs of array 140 within desired ranges. When the voltage level is less than the threshold level, control system 120 operates switched capacitor array 160 to discharge capacitors thereof to provide voltage for driving switched LED array 140.

Switched LED array 140 may thus be operable to provide a controllable and stable amount of light over an entire period of the AC voltage provided to input 102. Switched LED array 140 may also be operable to provide a controllable and stable amount of light for a variety of input AC voltage conditions, as described below. In some embodiments circuit 100 provides power to switched LED array 140 with relatively high efficiency, due to one or more of the low energy loss during charging and discharging of the capacitors of switched capacitor array 160, the lack of a transformer, a reduction or elimination of dissipative components, and reconfiguration of the LEDs of array 140 in response to the input voltage and light output requirements. For example, in some embodiments circuit 100 may have efficiencies of up to 95 or 98%.

Figure 2:
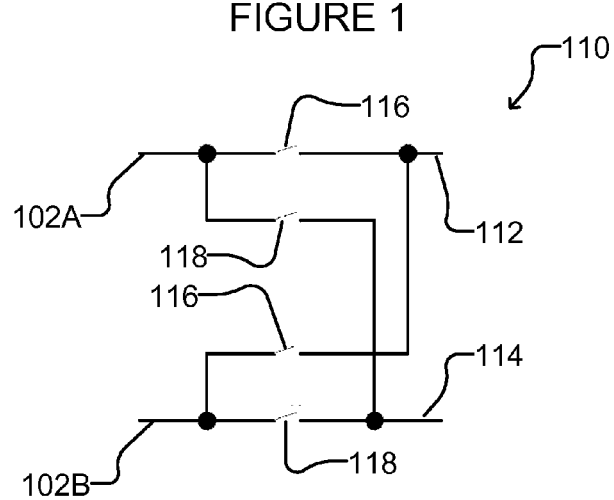
FIG. 2 shows an example switched rectifier of the circuit of FIG. 1.

FIG. 2 shows an example switched rectifier 110 (which may correspond to rectifier 110A or 110B of FIG. 1) having positive and negative outputs 112 and 114 (which may correspond to outputs 112A and 114A or 112B and 114B of FIG. 1). Rectifier 110 comprises two positive switches 116 for selectively connecting positive output 112 to line 102A or line 102B, and two negative switches 118 for selectively connecting negative output 114 to line 102A or line 102B under control of control system 120 (not shown in FIG. 2). Switches 116 and 118 may comprise, for example, switches having relatively low equivalent series resistance, such as MOSFETs. In some embodiments, switches 116 and 118 comprise GaN MOSFETs. In some embodiments, switches 116 and 118 are "high-side" switches configured to be able to accept voltage peaks of up to 350 or 400V.

Figure 2A:
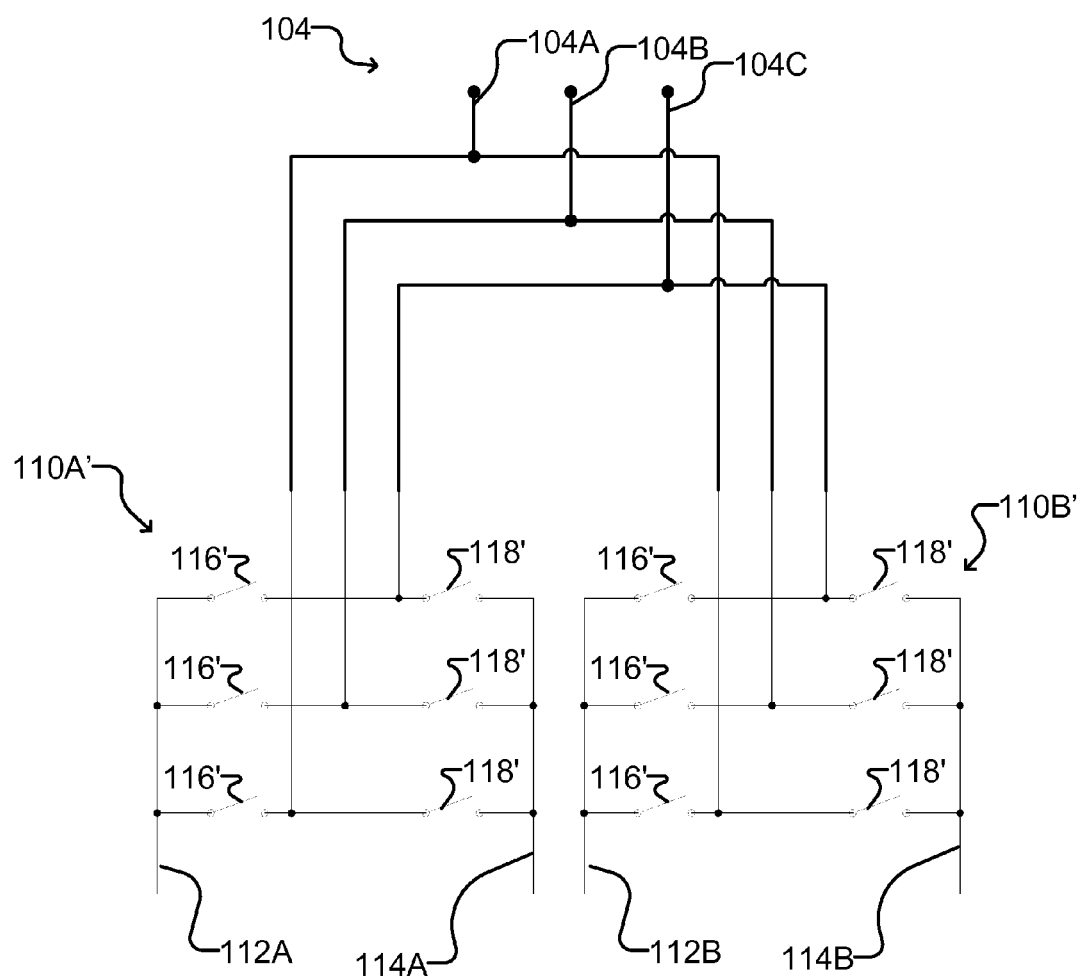
FIG. 2A shows example inputs and switched rectifiers of a lighting circuit according to another embodiment for receiving three phase AC power.

FIG. 2A shows a portion of another example circuit having an input 104 connectable to receive 3-phase voltage on lines 104A, 104B and 104C. The FIG. 2A example comprises first and second switched rectifiers 110A' and 110B', each of which having a positive output 112A/112B and a negative output 114A/114B which correspond to like-numbered outputs of the FIG. 1 example and are connected to switched LED array 140 (not shown in FIG. 2A) and switched capacitor array 160 (not shown in FIG. 2A) in the same fashion as described above with respect to FIG. 1. Each switched capacitor array 110A'/110B' comprises three positive switches 116' for selectively connecting positive output 112A/112B to line 104A, line 104B or line 104C, and three negative switches 118' for selectively connecting negative output 114A/114B to line 104A, line 104B or line 104C under control of control system 120 (not shown in FIG. 2A).

Figure 3:
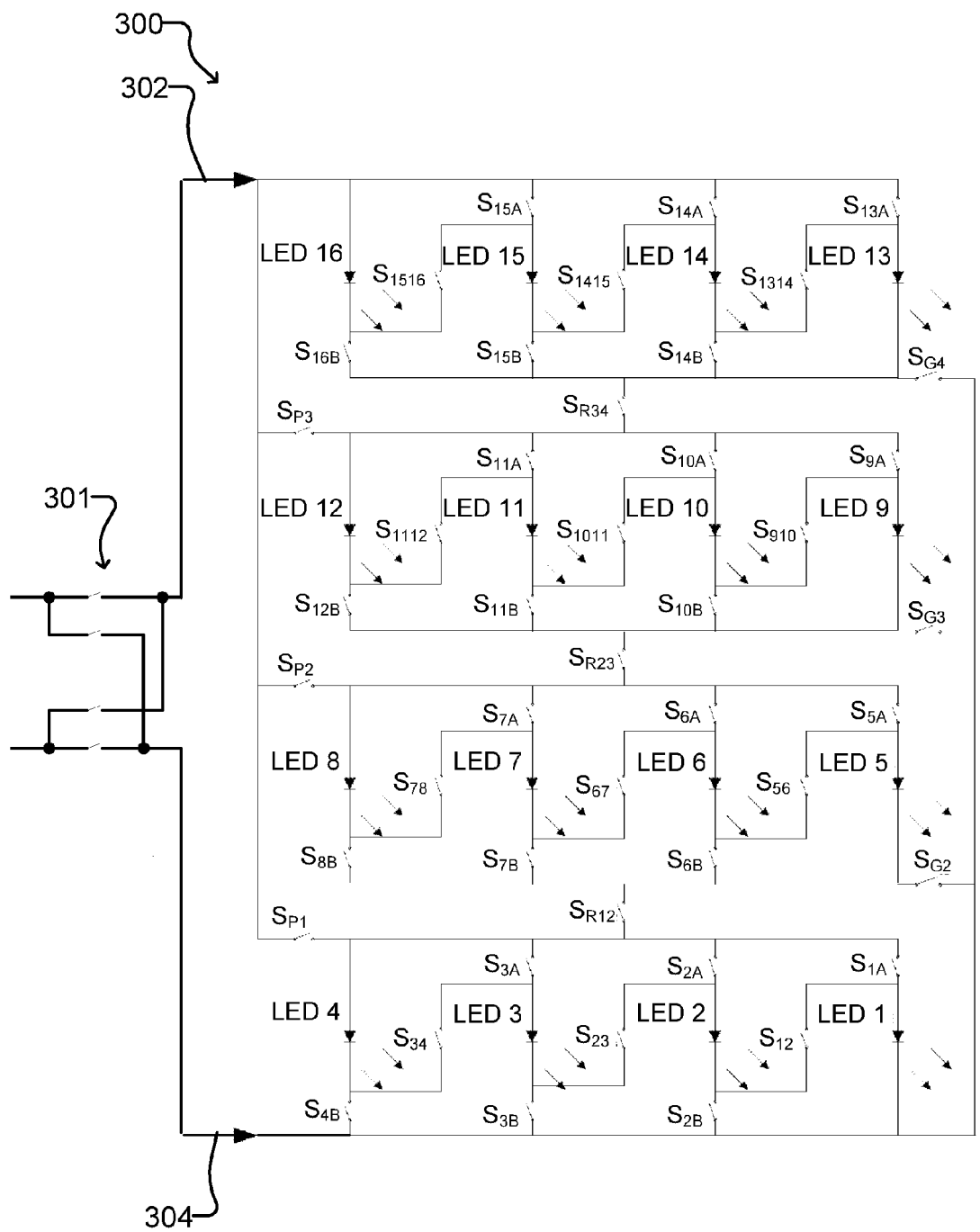
FIG. 3 shows an example switched LED array according to one embodiment.

FIG. 3 shows an example switched LED array 300, which may be used as array 140 in the circuit of FIG. 1 in some embodiments. Inputs 302 and 304 of array 300 are connectable to be directly driven by an input AC voltage through a switched rectifier 301. Array 300 comprises sixteen LEDs (individually labeled LED 1, LED 2, ... LED 16) connectable in a variety of configurations across inputs 302 and 304 by operation of switches SP1, SP2, SP3, SG2, SG3, SG4, SR1, SR23, SR34, S1A, S2A, S3A, S5A S6A, S7A, S9A, S10A, S11A, S13A, S14A, S15A, S2B, S3B, S4B, S6B, S7B, S8B, S10B, S11B, S12B, S14B, S15B, S16B, S12, S23, S34, S56, S67, S78, S910, S1011, S1112, S1314, S1415, and S1516, which may comprise, for example, MOSFET-based switches. For example, all sixteen LEDs may be connected in series across inputs 302 and 304 by closing switches SR12, SR23, SR34, S12, S23, S34, S56, S67, S78, S910, S1011, S1112, S1314, S1415, and S1516 and opening switches SP1, SP2, SP3, SG2, SG3, SG4, S1A, S2A, S3A, S5A, S6A, S7A, S9A, S10A, S11A, S13A, S14A, S15A, S2B, S3B, S4B, S6B, S7B, S8B, S10B, S11B, S12B, S14B, S15B, and S16B. All sixteen LEDs may be connected in parallel across inputs 302 and 304 by closing switches SP1, SP2, SP3, SG2, SG3, SG4, S1A, S2A, S3A, S5A S6A, S7A, S9A, S10A, S11A, S13A, S14A, S15A, S2B, S3B, S4B, S6B, S7B, S8B, S10B, S11B, S12B, S14B, S15B, and S16B and opening switches SR12, SR23, SR34, S12, S23, S34, S56, S67, S78, S910, S1011, S1112, S1314, S1415, and S1516 . As one skilled in the art will appreciate, the LEDs of array 300 may be arranged into any of the following configurations:

one to sixteen parallel strings, each having a single LED;
a single string of 2 to 16 series connected LEDs;
two parallel strings of 2 to 8 series connected LEDs;
three or four parallel strings of 2 to 4 series connected LEDs; or,
five to eight parallel strings of 2 series connected LEDs.

The number of series connected LEDs of a given configuration may be referred to as the number of energized rows, and the number of parallel strings of a given configuration may be referred to as the number of energized columns. It is to be understood that switched LED arrays according to other embodiments may have different arrangements and different number of LEDs than that of example array 300, which permit additional series-parallel LED configurations. For example, some embodiments provide a switched LED array having 40 or more LEDs. In some embodiments, a switched LED array may comprise a plurality of groups of two or more LEDs, and the groups are configurable into a plurality of series-parallel configurations.

Figure 4:
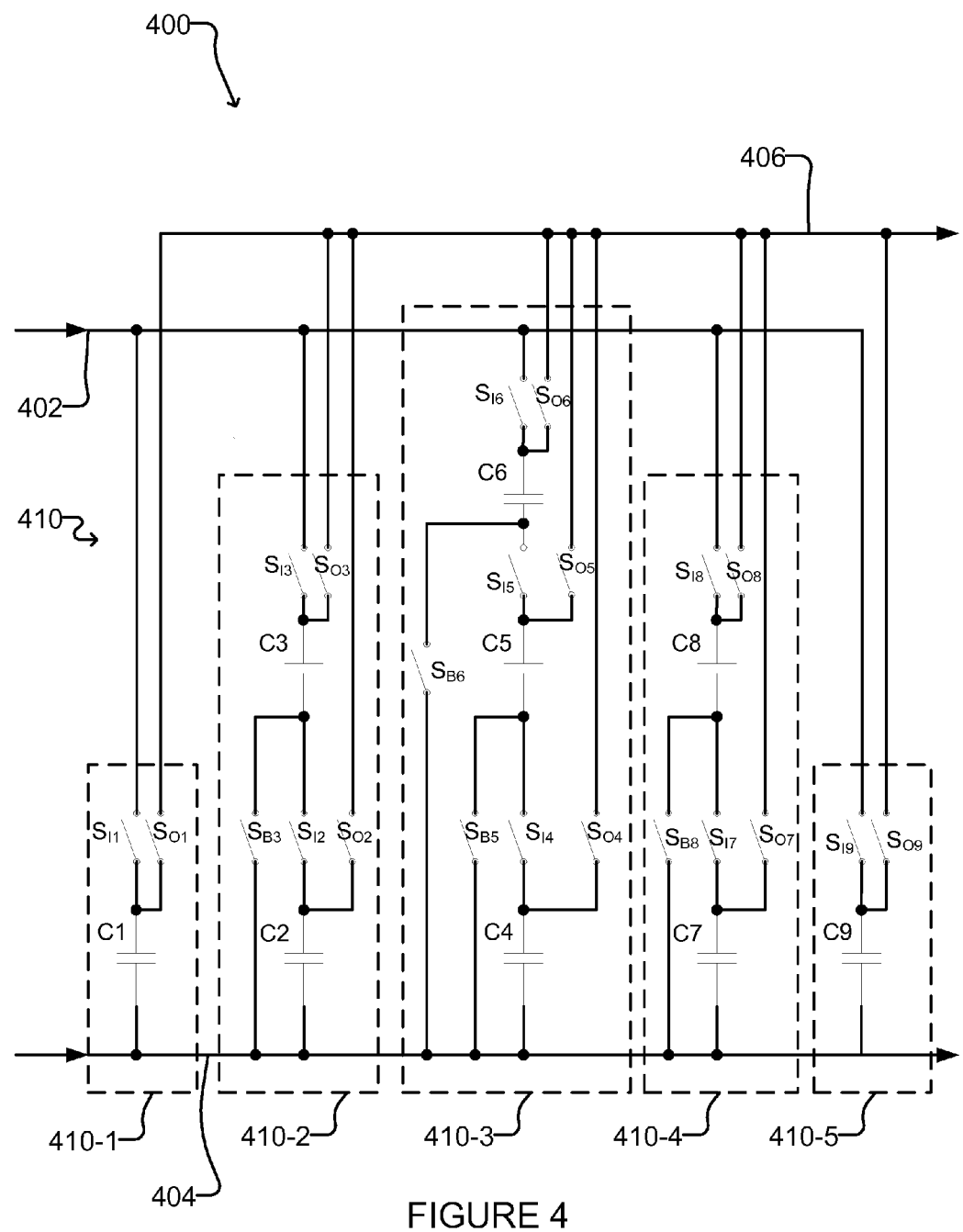
FIG. 4 shows an example switched capacitor array according to one embodiment.

FIG. 4 shows an example switched capacitor array 400, which may be used as array 160 in the circuit of FIG. 1 in some embodiments. Array 400 comprises a plurality of branches 410 selectably connectable between a first line 402 and a second line 404 under control of a control system (not shown in FIG. 4). Lines 402 and 404 are connected to an AC input voltage (not shown in FIG. 4). Each branch 410 comprises at least one capacitor, and at least one switch. In some embodiments, the capacitors may all have the same capacitances. In some embodiments, the capacitors may have different capacitances. The switches may comprise, for example, MOSFET-based switches. The control system is configured to operate the switches to selectably connect the capacitors of each branch in series between lines 402 and 404 for charging. Each capacitor is also selectably connectable between line 404 and an output line 406 for discharging. Output line 406 is connected to provide power to a switched LED array (not shown in FIG. 4) as described above. Line 404 is also connected to the switched LED array.

The control system sequentially selects branches for charging based on the number of capacitors in each branch, and controls the charging time for each branch 410. In some embodiments, the control system selects branches and controls charging times such that as the input voltage varies sinusoidally the capacitors of each branch are charged to substantially the same voltage. In some embodiments, the control system selects branches and controls charging times such that the capacitors are charged to different voltages. The capacitors may be charged to a nominal voltage which is less than the maximum voltage for the capacitors. The capacitors may be discharged by individually connecting charged capacitors one at time across lines 404 and 406. In some embodiments, the capacitors may be only partially discharged (e.g., the capacitor may have a low "depth of discharge") to reduce ripple in the output voltage.

Figure 4A:
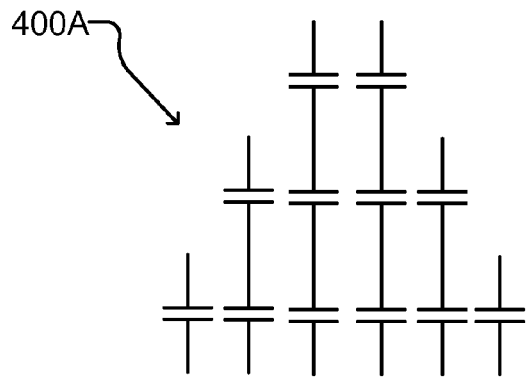
FIGS. 4A-C schematically illustrate other example switched capacitor arrays.
Figure 4B:
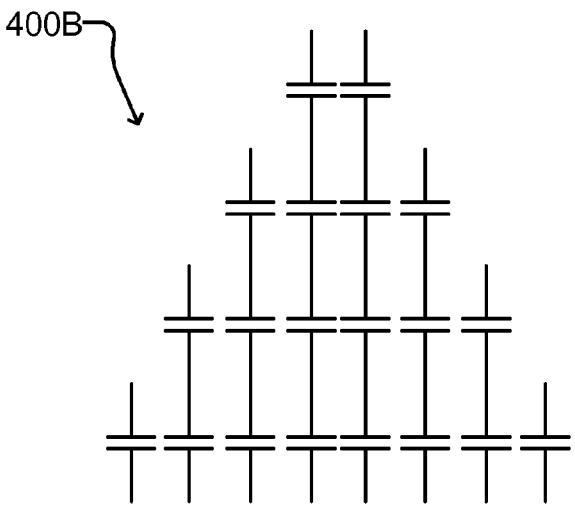
Figure 4C:
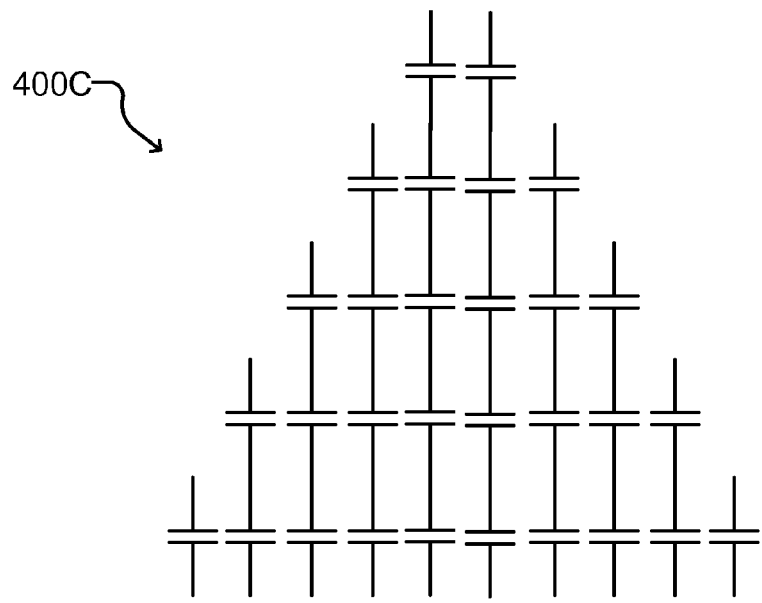

The example of FIG. 4 shows nine capacitors arranged in five branches 410 (individually numbered 410-1 to 410-5), but it is to be understood that array 400 could have a different number of capacitors and branches 410. For example, in some embodiments, a capacitor array may be provided having an even number of branches arranged in pairs of equal number of series connected capacitors. In some embodiments, a "central" pair of branches have a highest number of capacitors, and the other pairs of branches are symmetrically arranged on either side of the central pair, with an "outer" pair of branches having one capacitor each. FIGS. 4A to 4C schematically illustrate some example switched capacitor arrays (the switches and input/output lines are not shown in FIGS. 4A to 4C). FIG. 4A shows an array 400A having twelve capacitors arranged in six branches, with two branches having only one capacitor, two branches having two capacitors, and two branches having three capacitors. FIG. 4B shows an array 400B having twenty capacitors arranged in eight branches, with two branches having only one capacitor, two branches having two capacitors, two branches having three capacitors, and two branches having four capacitors. FIG. 4C shows an array 400C having thirty capacitors arranged in ten branches, with two branches having only one capacitor, two branches having two capacitors, two branches having three capacitors, two branches having four capacitors, and two branches having five capacitors. Other numbers of capacitors and arrangements of branches are also possible.

In some embodiments, a single switched capacitor array may be configured to accept a wide range of AC input voltage levels. In other embodiments, the switched capacitor array may be specifically adapted to accommodate a particular AC input voltage. The number of branches, number of capacitors in each branch, and characteristics of the capacitors may be selected based on the expected input voltage, to accommodate standard voltages for manufactured capacitors, and the output power requirements (e.g., voltage ripple). In general, the greater number of capacitors in the array, the smaller the individual capacitances may be and the smaller the voltage ripple. Conversely, using fewer capacitors generally requires higher individual capacitances and results in a higher voltage ripple. For example, for a standard 220V AC power supply, an array may be configured such that the branch(es) with the highest number of capacitors comprise three series connected capacitors (a "three level" array), and the capacitors may comprise 75 volt capacitors. Similarly, for a standard 220V AC power supply, a four level array may use 60 volt capacitors, a 5 level array may use 50 volt capacitors, a six level array may use 40 volt capacitors, etc. As another example, for an array like the example of FIG. 4B and an expected AC input voltage of 90 to 132 volts, 50 volt capacitors may be used and charged to a nominal voltage of 39 volts (or some other nominal voltage, depending on the arrangement of the switched LED array and the desired light output).

Returning to the example of FIG. 4, branch 410-1 comprises capacitor C1, branch 410-2 comprises capacitors C2 and C3, branch 410-3 comprises capacitors C4, C5 and C6, branch 410-4 comprises capacitors C7 and C8, and branch 410-5 comprises capacitor C9. Each capacitor CX has an input switch $S_{IX}$ associated therewith for selectively connecting that capacitor to line 402 (or to another capacitor in series between capacitor CX and line 402). Each capacitor CX has an output switch $S_{OX}$ associated therewith for selectively connecting that capacitor to line 406. Capacitors C3, C5, C6 and C8 also have bypass switches $S_{B3}$, $S_{B5}$, $S_{B6}$ and $S_{B8}$ respectively associated therewith for selectively connecting these capacitors directly to line 404. Thus, the capacitors in each branch 410 may be charged by closing all of the input switches $S_{IX}$ in that branch, thereby connecting the capacitors of that branch in series between lines 402 and 404, while keeping output switches $S_{OX}$ and any bypass switches $S_{BX}$ open. Any capacitor CX not in a branch being charged may be discharged by closing the associated output switch $S_{OX}$ and any bypass switch $S_{BX}$ (for capacitors not directly connected to line 404), thereby connecting that capacitor between lines 404 and 406, while keeping the associated input switch $S_{IX}$ open. In some embodiments, the depth of discharge of the capacitors may be relatively low to reduce ripple in the output voltage.

Switched capacitor arrays such as the example arrays shown in FIGS. 4-4C are operable to produce output voltages having a relatively constant DC level with a sawtooth-like ripple voltage. The frequency and amplitude of the ripple voltage is determined by the number of capacitors being discharged and the depth of the discharge.

Figure 5:
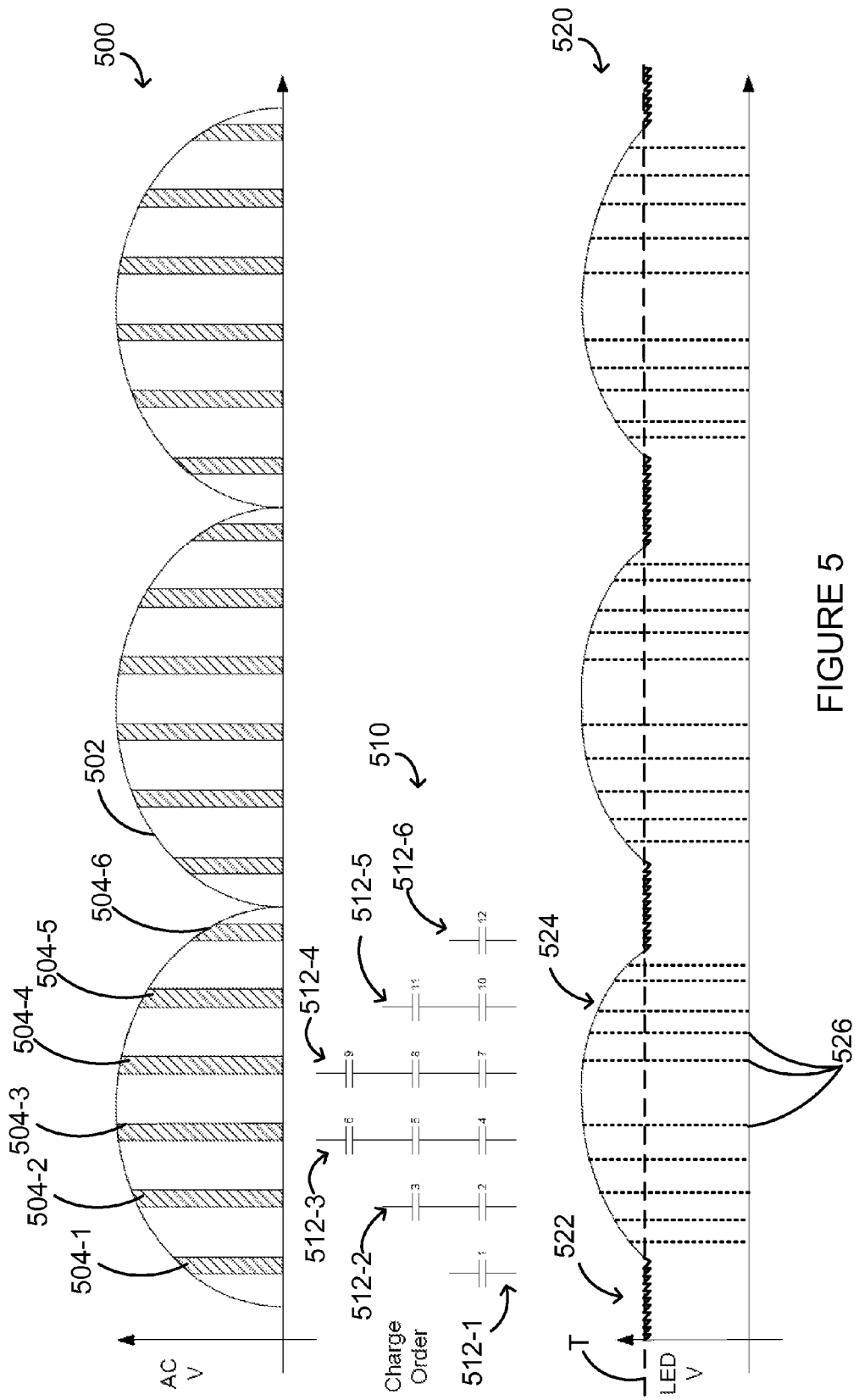
FIG. 5 shows example capacitor charging and LED voltage graphs for a sinusoidal AC input voltage.

FIG. 5 shows an example capacitor charging graph 500, an example capacitor charging order 510, and an example LED driving voltage graph 520. Graph 500 schematically illustrates a rectified AC input voltage 502 which selectively provided to a switched capacitor array by a switched rectifier. The switched rectifier is controlled to selectively connect branches of the switched capacitor array to the AC input voltage during charging periods 504 (individually labeled 504-1, 504-2, 504-3, 504-4, 504-5, and 504-6) during selected portions of each half wave of the rectified AC input voltage. As illustrated by charge order 510, a first branch 512-1 comprising one capacitor is connected during charging period 504-1, a second branch 512-2 comprising two capacitors is connected during charging period 504-2, a third branch 512-3 comprising three capacitors is connected during charging period 504-3, a fourth branch 512-4 comprising three capacitors is connected during charging period 504-4, a fifth branch 512-5 comprising two capacitors is connected during charging period 504-5, and a sixth branch 512-6 comprising one capacitor is connected during charging period 504-6.

Figure 5A:
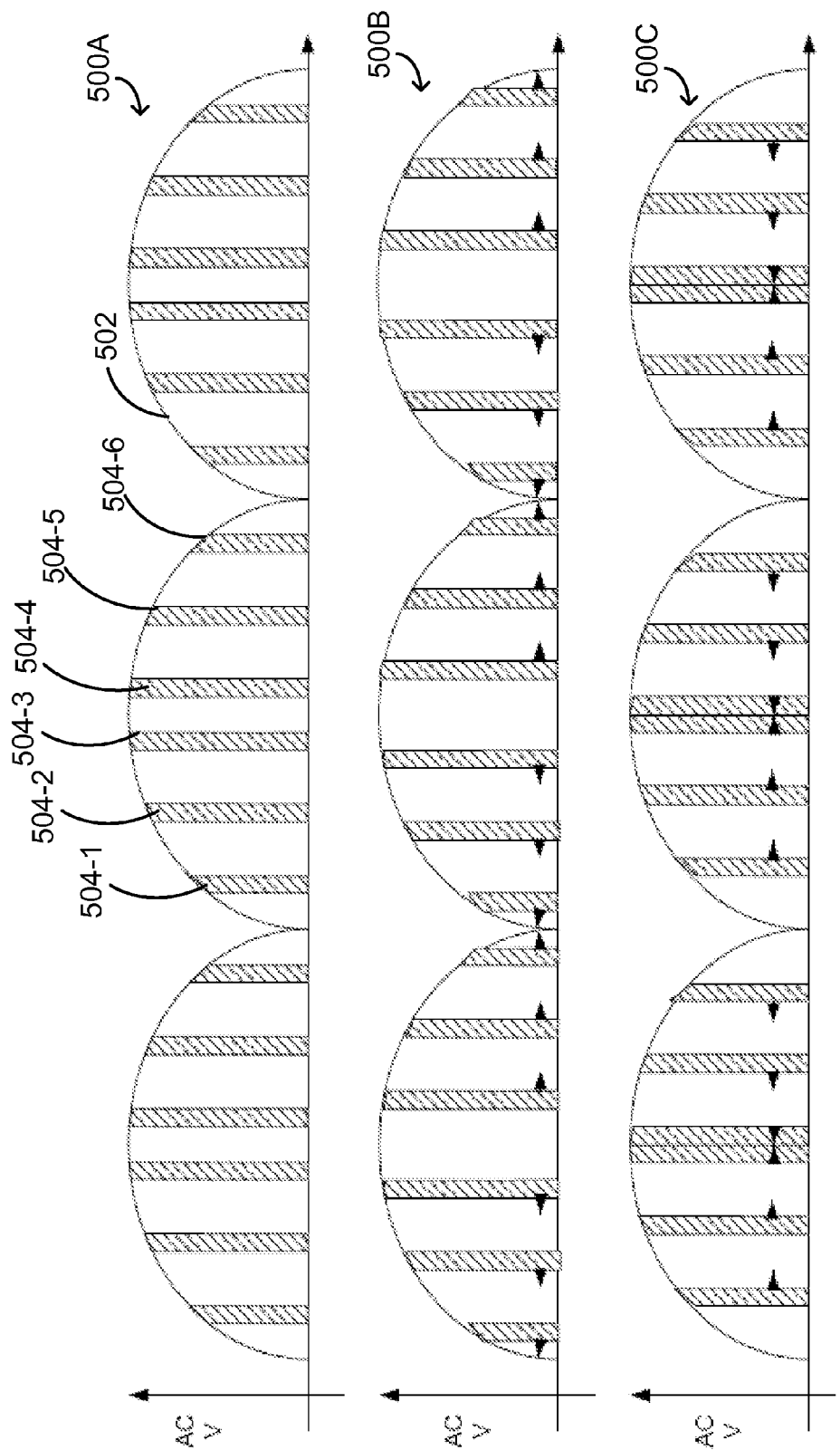
FIG. 5A illustrates how charging times may be varied to adjust the voltages to which the capacitors of a switched capacitor array are charged.

As shown in FIG. 5A, which shows graphs 500A, 500B and 500C which are similar to graph 500 of FIG. 5, the voltages to which the capacitors of branches 512 are charged may be varied by shifting charging periods 504 relative to the peak input voltage. For example, the voltages to which the capacitors of branches 512 are charged may be reduced by shifting charging periods 504 away from the peak voltage, as shown in graph 500B. Conversely, the voltages to which the capacitors of branches 512 are charged may be increased by shifting charging periods 504 toward the peak voltage, as shown in graph 500C.

Returning to FIG. 5, LED driving voltage graph 520 illustrates an example driving voltage applied to a switched LED array according to one embodiment. When the AC input voltage is below a threshold T, the switched LED array is driven by voltage provided from discharging capacitors of the switched capacitor array, as indicated by sawtooth-like portion 522. In some embodiments, threshold T may be determined by the voltage to which individual capacitors of the switched capacitor array are charged. Sawtooth-like portion 522 may, for example, comprise the output from a switched capacitor array wherein the capacitors are not charged to their maximum voltage and only partially discharged, such that the discharge voltage varies approximately linearly as each capacitor is discharged (the discharge voltage may not vary exactly linearly, but will generally also not be a purely capacitive discharge waveform due to load characteristics). When the AC input voltage is at least threshold T, the switched LED array is driven by voltage provided directly from the AC mains through a switched rectifier, as indicated by sinusoidal portion 524. Sinusoidal portion 524 comprises a plurality of configuration transitions 526 wherein the switched rectifier momentarily disconnects the switched LED array from the AC mains. The switched LED array may be reconfigured during transitions 526 such that a desired number of series connected LEDs in one or more parallel strings may be connected to receive the AC input voltage as the AC input voltage changes, in order to maintain the current through the LEDs within a desired range. In some embodiments, the voltage at which transitions 526 occur, and thus the average current through the LEDs, may be varied to control the overall brightness of light from the switched LED array.

Figure 5B:
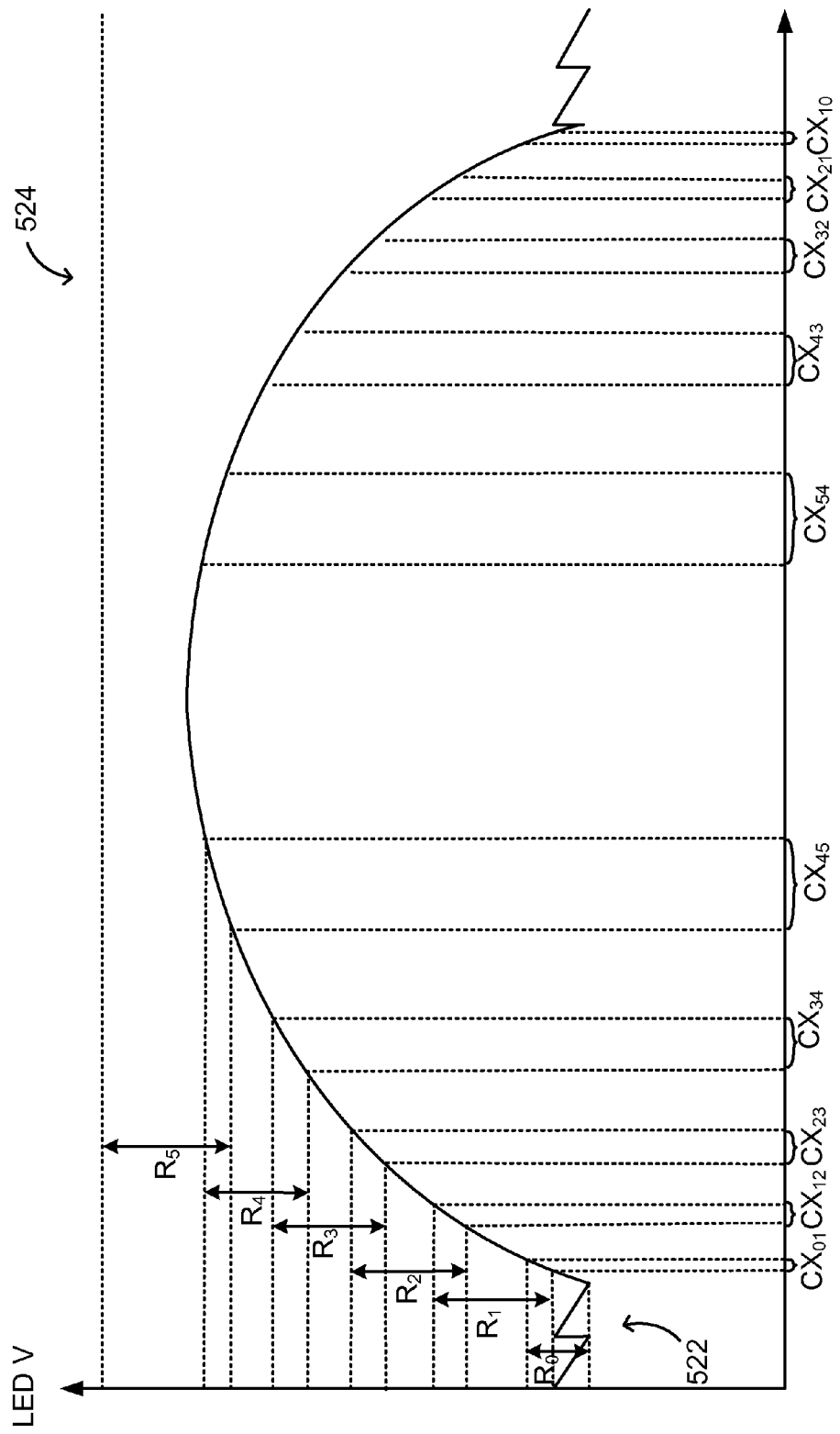
FIG. 5B illustrates how the voltage levels at which configuration transitions of a switched LED array occur may be varied to adjust the light output from the switched LED array.

FIG. 5B illustrates how the voltage at which configuration transitions of a switched LED array occur may be varied as the driving voltage changes between sawtooth-like portion 522 and sinusoidal portion 524, and as the driving voltage varies over sinusoidal portion 524. In the FIG. 5B example, the switched LED array is reconfigurable into six configurations, although it is to be understood that the array could have any number of different configurations. Each configuration has an associated operational voltage range $R_X$ (individually labeled $R_0$, $R_1$, $R_2$, $R_3$, $R_4$ and $R_5$), which has a lower limit determined by the forward voltage needed to cause the number of series connected LEDs in that configuration to emit light, and an upper limit determined by the maximum voltage which may be safely handled by the number of series connected LEDs in that configuration. The configurations may be selected such that the ranges of successive configurations overlap, which in turn permits the moment at which the configuration transitions occur to be varied within configuration transition ranges $CX_{\#\#}$ (individually labeled as $CX_{01}$, $CX_{12}$, $CX_{23}$, $CX_{34}$, $CX_{45}$, $CX_{54}$, $CX_{43}$, $CX_{32}$, $CX_{21}$ and $CX_{10}$, wherein $CX_{01}$ refers to the transition from first configuration to a second configuration, and so on). The overall brightness of light output by the switched LED array may be increased by controlling the configuration transitions to occur at higher voltages within ranges $CX_{01}$, $CX_{12}$, $CX_{23}$, $CX_{34}$, $CX_{45}$, $CX_{54}$, $CX_{43}$, $CX_{32}$, $CX_{21}$ and $CX_{10}$ (e.g., shifting the transitions occurring on the increasing portion of sinusoidal portion 524 rightwardly, and shifting the transitions occurring on the decreasing portion of sinusoidal portion 524 leftwardly, with reference to the directions in FIG. 5B), such that the switched LED array receives a higher average current for each configuration. Similarly, the overall brightness of light output by the switched LED array may be decreased by controlling the configuration transitions to occur at lower voltages within ranges $CX_{01}$, $CX_{12}$, $CX_{23}$, $CX_{34}$, $CX_{45}$, $CX_{54}$, $CX_{43}$, $CX_{32}$, $CX_{21}$ and $CX_{10}$ (e.g., shifting the transitions occurring on the increasing portion of sinusoidal portion 524 leftwardly, and shifting the transitions occurring on the decreasing portion of sinusoidal portion 524 rightwardly, with reference to the directions in FIG. 5B), such that the switched LED array receives a lower average current for each configuration.

Figure 5C:
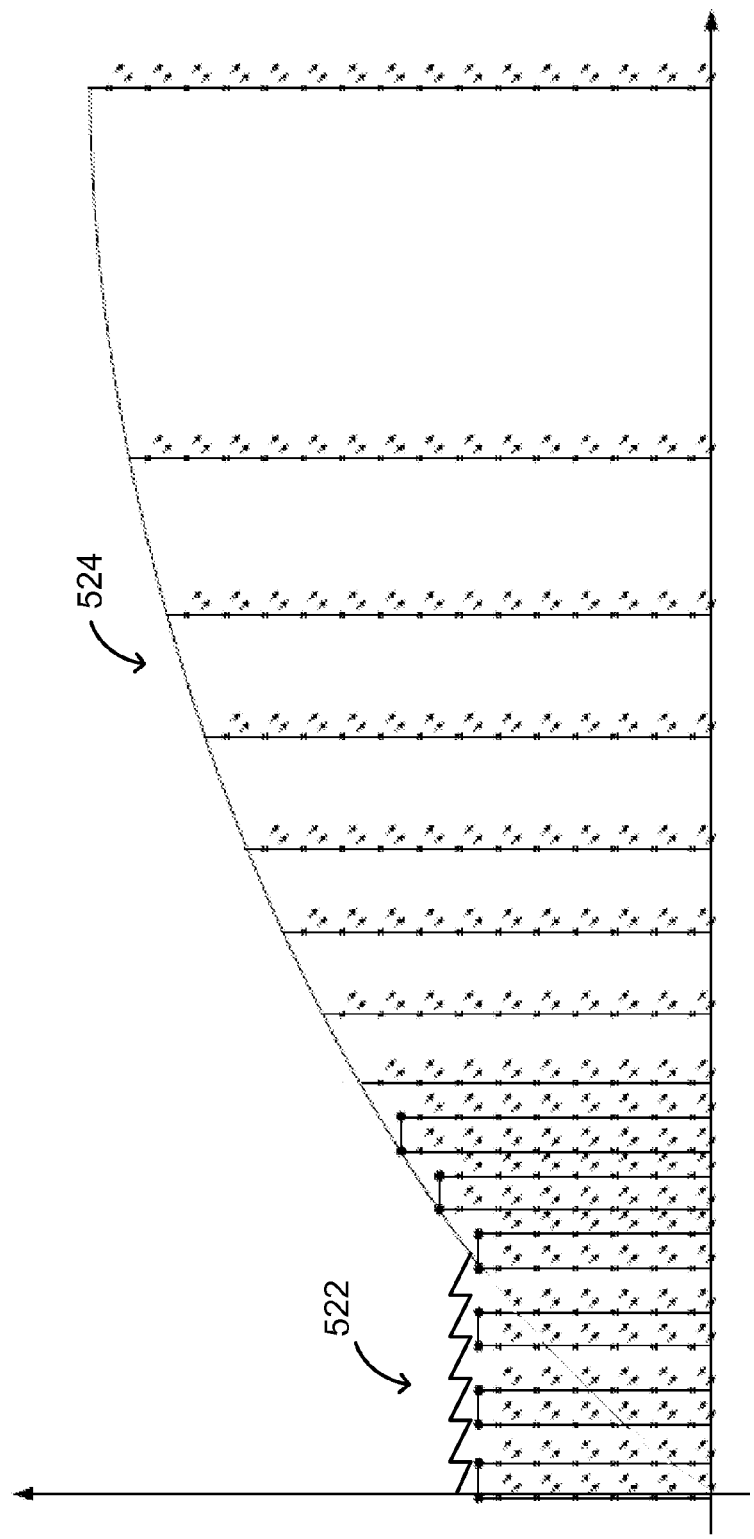
FIG. 5C shows an example series of configurations of a switched LED array.

FIG. 5C shows an example series of configurations of the switched LED array during sawtooth-like portion 522 and sinusoidal portion 524. During sawtooth-like portion 522, the configuration of the switched LED array remains constant, with two parallel strings of six series connected LEDs. Such a configuration may be suitable in embodiments where each capacitor of the switched capacitor array is charged to a voltage at least as high as the forward voltage of six series connected LEDs. During sinusoidal portion 524, the switched LED array is reconfigured as the input voltage rises to have two parallel strings of seven series connected LEDs, then two parallel strings of eight series connected LEDs, followed successively by single strings of nine, ten, eleven, twelve, thirteen, fourteen, fifteen and sixteen series connected LEDs. The same pattern may be repeated in inverse order for the downward portion (not shown) of sinusoidal portion 524, As one skilled in the art will appreciate, other series of configurations of the switched LED array are also possible, and may be selected based on the characteristics of the individual LEDs, the AC input voltage, the switched capacitor array, and the desired light output.

Figure 5D:
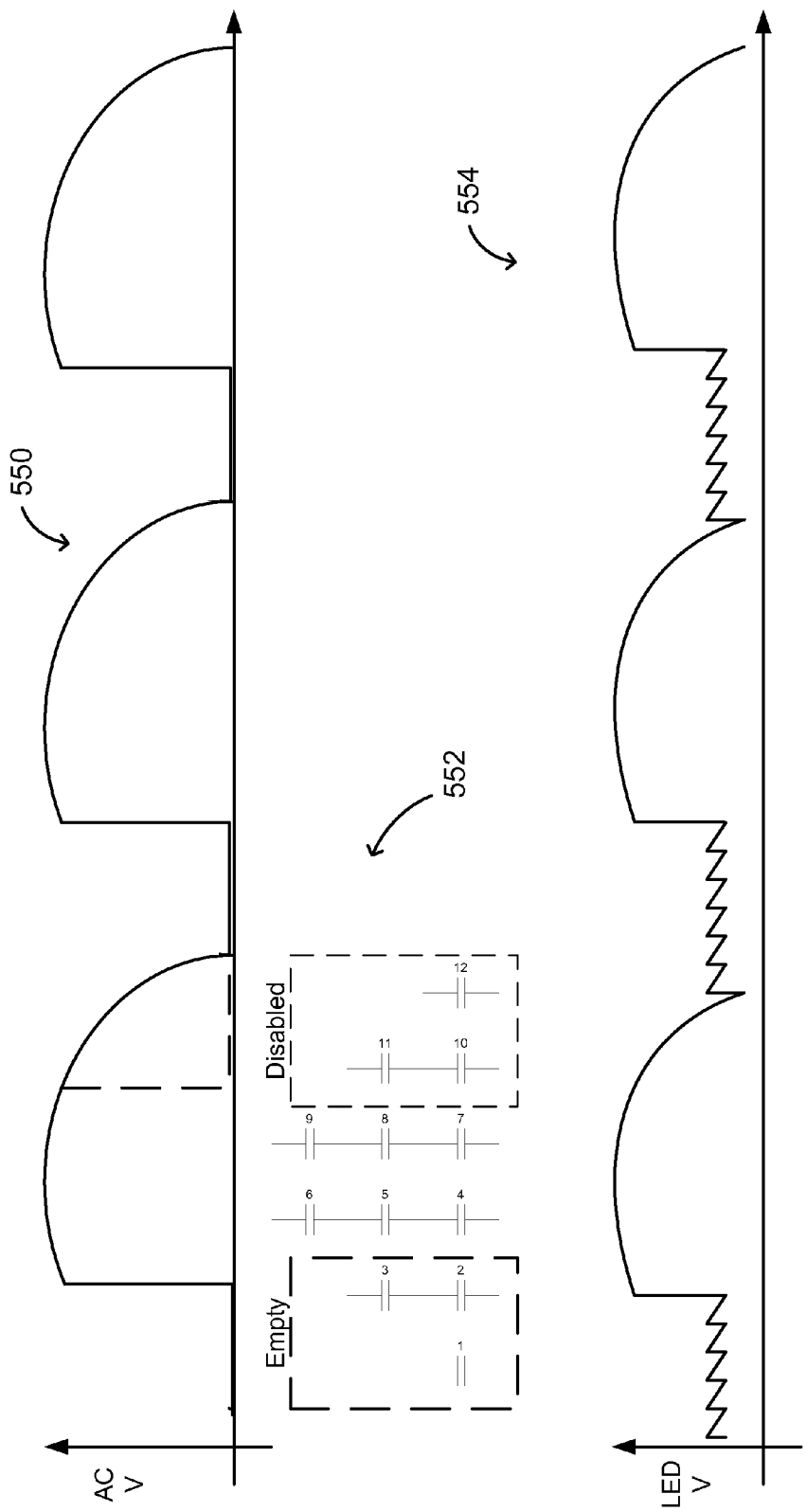
FIG. 5D shows example capacitor charging and LED voltage graphs for a leading-edge phase-cut sinusoidal AC input voltage.

FIG. 5D shows an example of how a switched capacitor array and a switched LED array may be controlled to accommodate a phase-cut AC input waveform 550. An example charging order 552 and example LED driving voltage supply waveform 554 are shown below AC input waveform 550. As shown in charging order 552, the first and second branches of capacitors (comprising capacitors labeled 1, 2 and 3) are not charged since there is no input voltage present at the time when those branches would be charged in a sinusoidal input voltage situation. In response to detecting such a leading-edge phase-cut angle, the control system disables charging of the last two branches of capacitors (comprising capacitors labeled 10, 11 and 12), such that only the middle two branches of capacitors are charged. As a result, capacitor charging current is centered around the peak input voltage, resulting in improved power factor. Discharging of the charged capacitors (labeled 4, 5, 6, 7, 8 and 9) is evenly distributed over the phase-cut portion of the input AC waveform 550, and the LED array is directly driven from the AC input waveform during the non-phase-cut portion of the input AC waveform 550, as shown by waveform 554.

Figure 5E:
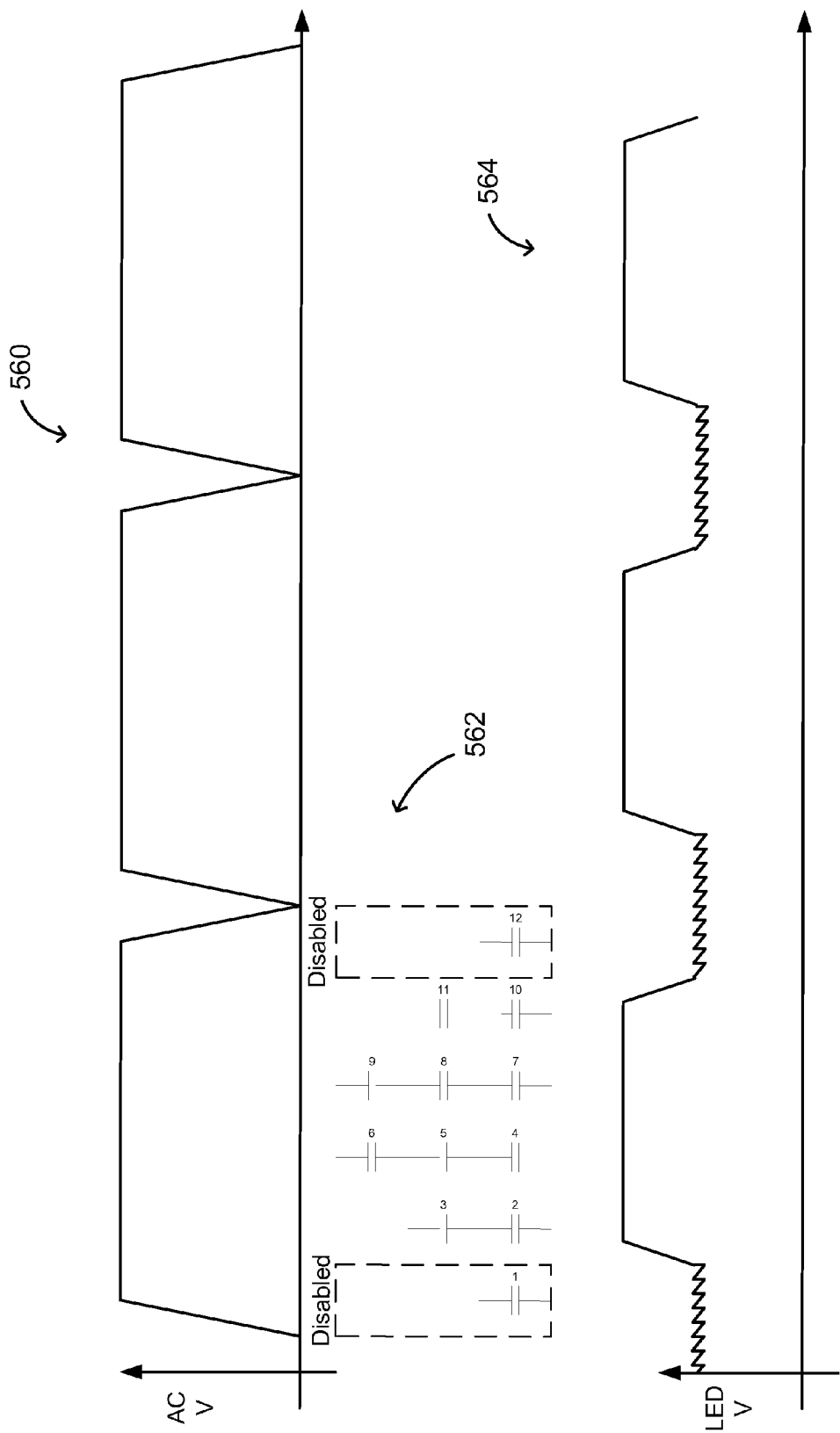
FIG. 5E shows example capacitor charging and LED voltage graphs for a rectangular AC input voltage.

FIG. 5E shows an example square wave AC input waveform 560. An example charging order 562 and example LED driving voltage supply waveform 564 are shown below AC input waveform 560. As shown in example charging order 562, the first and last branches of capacitors (comprising capacitors labeled 1 and 12, respectively) are disabled to prevent the current being provided to the capacitor array from exceeding a maximum desired current. As shown in example waveform 564, discharging of the charged capacitors (labeled 2 through 11) is evenly distributed over each valley of the input waveform 560.

Figure 6:
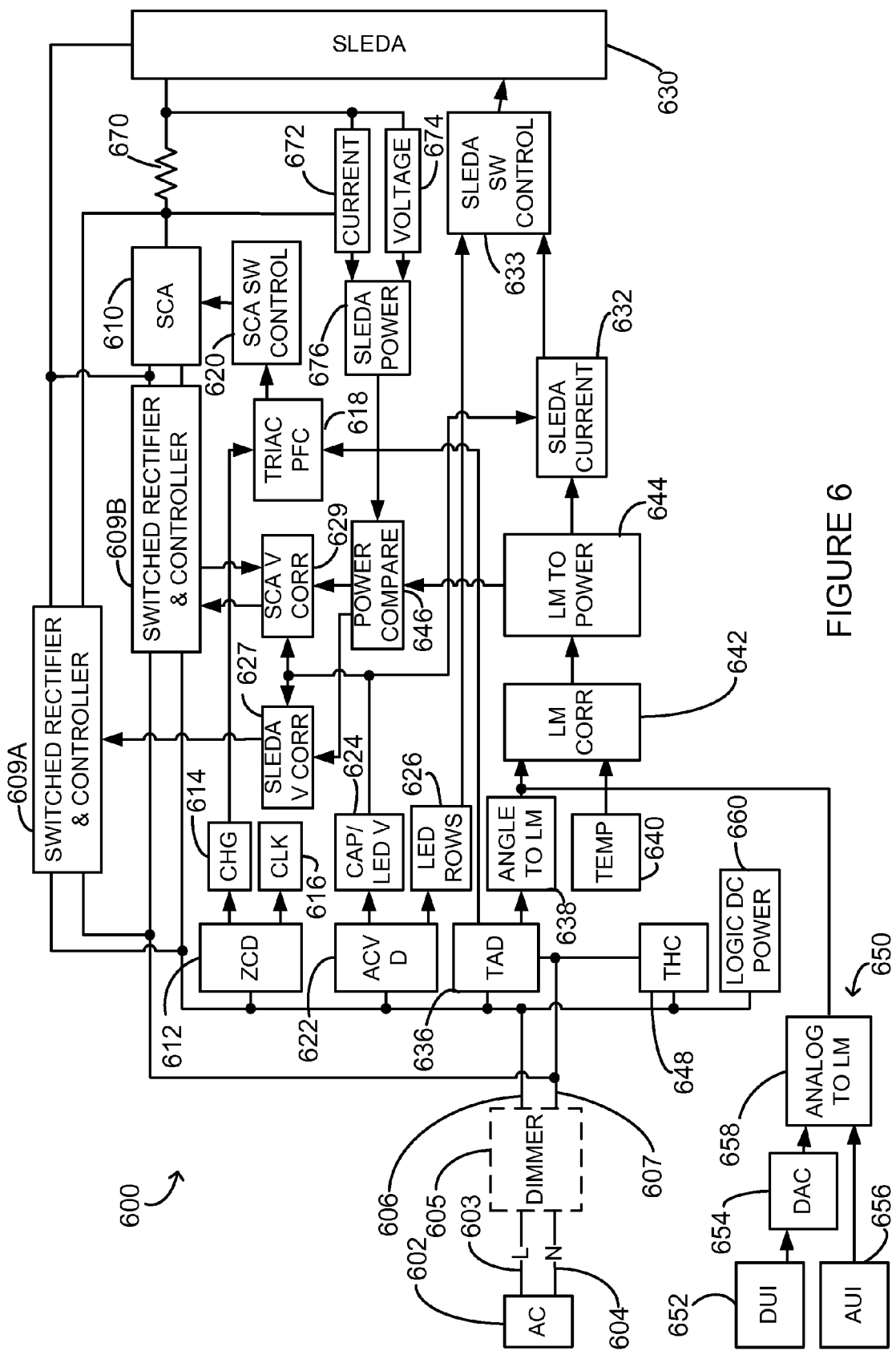
FIG. 6 shows an example control system according to one embodiment.

FIG. 6 shows an example control system 600 which may be used in lighting circuits of type shown in FIG. 1 in some embodiments. An AC power source 602 provides a sinusoidal input voltage to live and neutral lines 603 and 604. A dimmer 605 may optionally be provided (as indicated by the dashed lines showing dimmer 605) along lines 603 and 604. When present, dimmer 605 is operable by a user to selectively reduce the power provided in lines 603 and 604 (typically by cutting out a variable leading or trailing portion of each half wave through use of a TRIAC or the like), and the dimmer-modulated AC voltage is provided to lines 606 and 607. When no dimmer is present, the sinusoidal AC input voltage is provided directly to lines 606 and 607.

Lines 606 and 607 are connected to provide LED driving voltage to a switched LED array (SLEDA) 630 through a first switched rectifier 609A, and to provide charging voltage to a switched capacitor array (SCA) 610 through a second switched rectifier 609B. Switched rectifiers 609A and 609B each have a built-in controller configured to control the operation thereof in response to various control signals, as described below. In some embodiments, switched rectifiers 609A and 609B provide protection against over-voltage, under voltage, and over current conditions. SCA 610 may also selectively provide LED driving voltage to SLEDA 630. The power provided to SLEDA 630 by the LED driving voltage (whether provided by SCA 610 or through switched rectifier 609A) is monitored using a resistor 670, as described below.

Line 606 is also connected to a zero crossing detection block 612, an AC voltage detection block 622, TRIAC angle detection block 636, a TRIAC holding current block 648, and a logic DC power block 660. Line 607 is connected to TRIAC angle detection block 636 and TRIAC holding current block 648. TRIAC holding current block 648 is configured to selectively draw additional current from lines 606 and 607, such that at least a target holding current is always drawn through dimmer 605 to maintain proper dimmer operation.

Zero crossing detection block 612 detects the voltage in line 606 transitioning from negative to positive (and vice versa) and provides a signal indicating the zero crossing time to a charge enable block 614 and a timing block 616 which provides timing information to other blocks of system 600, either directly or through one or more system clocks. Charge enable block 614 provides a charge enable signal to a TRIAC power factor correction (PFC) block 618. When a dimmer is present, TRIAC PFC block 618 also receives a signal indicating a detected phase cut angle from TRIAC angle detection block 636. TRIAC PFC block 618 provides charge enable and power factor correction information to a SCA switch control block 620 to control the charging and discharging of the capacitors of SCA 610. SCA switch control block 620 in turn is configured to sequentially select individual branches of capacitors of SCA for charging based on the charge enable and power factor correction information, and connects the selected branch to the outputs of switched rectifier 609B to receive charging voltage. SCA switch control block 620 may, for example, connect the selected branch to switched rectifier 609B before the switches of switched rectifier 609B are closed to begin a charging period, such that the selected branch is ready for charging in advance of the actual charging time. SCA switch control block 620 is also configured to sequentially connect charged capacitors one at a time across the input of SLEDA 630 (through resistor 670) for discharging.

AC voltage detection block 622 detects the peak voltage on line 606 and provides peak voltage information to a capacitor/LED voltage block 624 and a LED row number block 626. Capacitor/LED voltage block 624 determines a charging target voltage to which the capacitors of SCA 610 are to be charged, and configuration transition target voltages at which SLEDA is to be reconfigured, and provides the target voltages to a SLEDA voltage correction block 627, a SCA voltage correction block 629 and a SLEDA current block 632. LED row number block 626 determines a desired number of rows of LEDs (e.g. a number of series connected LEDs) to be energized in SLEDA 630 based on the target voltages, the peak voltage, timing information, and the desired light output, and provides the desired number of rows to SLEDA switch control block 633.

When a dimmer is present, TRIAC angle detection block 636 detects a phase cut angle caused by operation of dimmer 605, and provides the detected phase cut angle to TRIAC PFC block 618 (as discussed above) and an angle to luminance conversion block 638. Angle to luminance conversion block 638 determines a desired luminance based on the phase cut angle. Angle to luminance conversion block 638 may, for example, apply an exponential conversion. Angle to luminance conversion block 638 provides the desired luminance to a luminance correction block 642. When no dimmer is present, the desired luminance may be set to a nominal luminance. Luminance correction block 642 also receives a temperature signal from a temperature sensor 640, and applies a correction to the desired luminance based on the temperature signal. Temperature sensor 640 may, for example, be positioned near a heat sink (not shown) for SLEDA 630.

Luminance correction block 642 may alternatively receive the desired luminance from an alternate user interface system 650. System 650 typically comprises either a digital user interface 652 and a digital to analog converter 654, or an analog user interface 656, which provides an analog control signal to an analog to luminance conversion block 658. Analog to luminance conversion block 658 determines the desired luminance based on the analog control signal, and provides the desired luminance to luminance correction block 642. In some embodiments, when a desired luminance is received from both angle to luminance conversion block 638 and analog to luminance conversion block 658, the desired luminance from angle to luminance conversion block 638 takes precedence.

Luminance correction block 642 provides a corrected luminance to a luminance to power conversion block 644. Luminance to power conversion block 644 determines a desired power corresponding to the corrected luminance, and provides the desired power to a power comparison block 646, and to SLEDA current block 632.

SLEDA current block 632 uses the desired power received from luminance to power conversion block 644 and the target voltages received from capacitor/LED voltage block 624 to determine a desired current to be drawn by SLEDA 630. SLEDA current block 632 provides the desired current and the target voltages to SLEDA switch control block 633. SLEDA switch control block 633 controls reconfiguration of SLEDA 630 into a plurality of series-parallel configurations.

A current detection block 672 and a voltage detection block 674 respectively detect current and voltage being provided from SCA 610 to SLEDA 630 through resistor 670, and provide the detected current and voltage to a SLEDA power block 676. SLEDA power block 676 determines the actual power being delivered to SLEDA 630, and provides the actual power to power compare block 646. Power compare block 646 compares the actual power received from SLEDA power block 676 to the desired power received from luminance to power conversion block 644, and provides the power comparison results to SLEDA voltage correction block 627 and SCA voltage correction block 629. SLEDA voltage correction block 627 provides control signals to the controller of switched rectifier 609A based on the target voltages received from capacitor/LED voltage block 624 and the power comparison received from power compare block 646. SCA voltage correction block 629 determines a corrected charging target voltages based on the target voltages received from capacitor/LED voltage block 624 and the power comparison received from power compare block 646. SCA voltage correction block 629 also receives information indicating the input voltage level from the controller of switched rectifier 609B, and uses the input voltage level and the corrected charging target voltage to provide a control signal to the controller of switched rectifier 609A to charge the selected branch of capacitors of SCA 610.

By monitoring both the actual current and voltage provided to SLEDA 630 (by blocks 672 and 674), and using the corresponding power to control the charging of capacitors in SCA 610, control system 600 thus provides power-based control of SLEDA 630.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. The lighting circuit, comprising:
an AC input connectable to receive an AC input voltage
a switched LED array comprising a plurality of LEDs connectable into a plurality of configurations, the switched LED array having an input for receiving a LED driving voltage;
a switched capacitor array having an input for receiving a charging voltage and an output selectively connectable to the input of the switched LED array, the switched capacitor array comprising a plurality of capacitors and a plurality of switches configured to selectively couple the capacitors across the input of the switched capacitor array or the output of the switched capacitor array;
a first switched rectifier connected between the AC input and the input of the switched LED array;
a second switched rectifier connected between the AC input and the input of the switched capacitor array; and,
a control system configured to monitor the AC input voltage and control the switched LED array, the switched capacitor array, the first switched rectifier and the second switched rectifier based on the AC input voltage and a desired light output.

2. The circuit according to claim 1 wherein the control system is configured to connect the input of the switched LED array to the AC input through the first switched rectifier when the AC input voltage is at least a threshold voltage such that the switched LED array receives the AC input voltage as the LED driving voltage.

3. The circuit according to claim 2 wherein the control system is configured to connect the input of the switched LED array to the output of the switched capacitor array when the AC input voltage is less than the threshold voltage and sequentially connect capacitors of the switched capacitor array for discharging across the output of the switched capacitor array such that the switched LED array receives a capacitor discharge voltage as the LED driving voltage.

4. The circuit according to claim 2 wherein, when the AC input voltage is at least the threshold voltage, the control system operates to reconfigure the switched LED array as the AC input voltage changes such that current through the LEDs is maintained within a desired range.

5. The circuit according to claim 4 wherein the control system is configured to open switches of the first switched rectifier to momentarily disconnect the switched LED array from the AC input voltage while the switched LED array is being reconfigured.

6. The circuit according to claim 4 wherein the control system is configured to control an overall brightness of light output by the switched LED array by adjusting voltages at which configuration transitions occur.

7. The circuit according to claim 6 wherein the control system is configured to adjust the configuration transitions to occur at higher voltages to increase the overall brightness.

8. The circuit according to claim 6 wherein the control system is configured to adjust the configuration transitions to occur at lower voltages to decrease the overall brightness.

9. The circuit according to claim 3 wherein the control system is configured operate the second switched rectifier and the switched capacitor array to charge each of the plurality of capacitors to at least the threshold voltage.

10. The circuit according to claim 1 wherein the plurality of capacitors of the switched capacitor array are arranged in a plurality of branches having different numbers of capacitors in each branch, and wherein the control system is configured to operate the second switched rectifier and the switches of the switched capacitor array to connect the capacitors of a selected branch in series to receive the AC input voltage to charge the capacitors of the selected branch, wherein the selected branch has a number of capacitors selected based on an input voltage level and the selected branch varies as the input voltage level changes.

11. The circuit according to claim 10 wherein the branches of the switched capacitor array are arranged in a charging order wherein the number of capacitors in the branches varies across the charging order to correspond to a sinusoidal input voltage.

12. The circuit according to claim 10 wherein the control system is configured to control a charging time for each selected branch such that all of the capacitors are charged to the same voltage level.

13. The circuit according to claim 12 wherein each selected branch is charged for a charging period, and wherein the control system is configured to vary the voltage to which the capacitors are charged by adjusting the charging period relative to the AC input voltage.

14. The circuit according to claim 13 wherein the control system is configured to increase the voltage to which the capacitors are charged by shifting the charging periods toward a peak voltage, and wherein the control system is configured to decrease the voltage to which the capacitors are charged by shifting the charging periods away from a peak voltage.

15. A method comprising:
provide a switched LED array comprising a plurality of LEDs connectable into a plurality of configurations, the switched LED array having an input for receiving a LED driving voltage;
providing a switched capacitor array having an input for receiving a charging voltage and an output selectively connectable to the input of the switched LED array, the switched capacitor array comprising a plurality of capacitors and a plurality of switches configured to selectively couple the capacitors across the input of the switched capacitor array or the output of the switched capacitor array;
providing a first switched rectifier connected between an AC input and the input of the switched LED array;
providing a second switched rectifier connected between the AC input and the input of the switched capacitor array;
monitoring an AC input voltage at the AC input; and,
controlling the switched LED array, the switched capacitor array, the first switched rectifier and the second switched rectifier based on the AC input voltage and a desired light output.

16. The method according to claim 15 comprising connecting the input of the switched LED array to the AC input through the first switched rectifier when the AC input voltage is at least a threshold voltage such that the switched LED array receives the AC input voltage as the LED driving voltage.

17. The method according to claim 16 comprising connecting the input of the switched LED array to the output of the switched capacitor array when the AC input voltage is less than the threshold voltage and sequentially connecting capacitors of the switched capacitor array for discharging across the output of the switched capacitor array such that the switched LED array receives a capacitor discharge voltage as the LED driving voltage.

18. The method according to claim 16 comprising, when the AC input voltage is at least the threshold voltage, reconfiguring the switched LED array as the AC input voltage changes such that current through the LEDs is maintained within a desired range.

19. The method according to claim 18 comprising opening switches of the first switched rectifier to momentarily disconnect the switched LED array from the AC input voltage while the switched LED array is being reconfigured.

20. The method according to claim 18 comprising controlling an overall brightness of light output by the switched LED array by adjusting voltages at which configuration transitions occur.

21. The method according to claim 20 comprising adjusting the configuration transitions to occur at higher voltages to increase the overall brightness.

22. The method according to claim 20 comprising adjusting the configuration transitions to occur at lower voltages to decrease the overall brightness.

23. The method according to claim 17 comprising operating the second switched rectifier and the switched capacitor array to charge each of the plurality of capacitors to at least the threshold voltage.

24. The method according to claim 15 wherein the plurality of capacitors of the switched capacitor array are arranged in a plurality of branches having different numbers of capacitors in each branch, comprising operating the second switched rectifier and the switches of the switched capacitor array to connect the capacitors of a selected branch in series to receive the AC input voltage to charge the capacitors of the selected branch, wherein the selected branch has a number of capacitors selected based on an input voltage level and the selected branch varies as the input voltage level changes.

* * * * *